United States Patent
Tanaka et al.

(10) Patent No.: US 7,833,375 B2
(45) Date of Patent: Nov. 16, 2010

(54) METHOD AND APPARATUS FOR BUTT-JOINTING EDGES OF ELASTIC MATERIAL SHEET

(75) Inventors: Gaku Tanaka, Kobe (JP); Kazuaki Yarimizu, Kobe (JP); Masayuki Sakamoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 760 days.

(21) Appl. No.: 11/790,235

(22) Filed: Apr. 24, 2007

(65) Prior Publication Data

US 2008/0017297 A1    Jan. 24, 2008

(30) Foreign Application Priority Data

Jun. 1, 2006    (JP)    .............................. 2006-153832

(51) Int. Cl.
*B31F 5/00*    (2006.01)
(52) U.S. Cl. .................... 156/157; 156/110.1; 156/122; 156/131; 156/134; 156/136; 156/304.1; 156/304.3; 156/304.5; 156/502; 156/504
(58) Field of Classification Search .............. 156/110.1, 156/131, 136, 157, 304.1, 304.3, 304.5, 502, 156/504, 122, 134
See application file for complete search history.

(56) References Cited

U.S. PATENT DOCUMENTS 4,231,836 A * 11/1980 Ljungqvist et al. .......... 156/350
5,221,409 A *  6/1993 Hart et al. .................... 156/421

FOREIGN PATENT DOCUMENTS

| EP | 0 698 479 A1 | 2/1996 |
|---|---|---|
| JP | 6-896 A | 1/1994 |
| JP | 8-238686 A | 9/1996 |
| JP | 2003-71951 A | 3/2003 |

* cited by examiner

*Primary Examiner*—Kat Wyrozebski
*Assistant Examiner*—Joshel Rivera
(74) *Attorney, Agent, or Firm*—Birch, Stewart, Kolasch & Birch, LLP

(57) ABSTRACT

A method and an apparatus for butt-jointing edges of an elastic material sheet is disclosed. The elastic material sheet is supported such that the two edges to be butt-jointed are oppositely opposed. By moving a pair of counterrotating conical surfaces along the edges, the surfaces of the edges portions are drawn toward the center between the two edges so that the edges are butt-jointed. Between the conical surfaces, a small space is provided so as to form a small rib-like protrusion along the butt-joint. Then, the small rib-like protrusion of the elastic material is pressed down to flatten. Therefore, at the butt-joint interface, the elastic material irregularly interfuses to increase the strength of the butt-joint.

8 Claims, 14 Drawing Sheets

METHOD AND APPARATUS FOR BUTT-JOINTING EDGES OF ELASTIC MATERIAL SHEET

BACKGROUND OF THE INVENTION

The present invention relates to a method and apparatus for butt-jointing edges of an elastic material sheet made from a sticky material such as uncured rubber.

In a process of manufacturing a pneumatic tire, a strip of uncured rubber in which reinforcing are cords embedded is wound around a drum, and in order to form a cylinder hollow, the circumferential ends of the strip are jointed by simply butting them together utilizing the tackiness of the uncured rubber.

Japanese patent application publication No. 8-238686 discloses an apparatus for jointing the circumferential ends of a wound carcass ply, namely, a strip of uncured rubber in which carcass cords are embedded, wherein as shown in FIG. 19, one pair of conical rotators CR which are rotated at the same speed in the counter directions are pressed against the upper surface of the carcass ply P while supporting the under surface thereof by a cylindrical roller SR. When the edges PE of the ply P pass through the conical rotators CR, the upper surfaces of the edge portions are drawn towards the center Gc by the conical surfaces of the conical rotators CR, and the edges are butt-jointed.

In order to butt-joint the edges strongly and surely, if the force to draw the upper surfaces of the edge portions is increased, then the edge portions are liable to crinkle and the joint is liable to stagger. This is remarkable when the cords embedded are organic fiber cords softer than steel cords. If the force to draw is small, during building the raw tire for example, the joint is broken and the tire uniformity such as Radial force variation is deteriorated.

SUMMARY OF THE INVENTION

It is therefore, an object of the present invention to provide a method and an apparatus by which edges of an elastic material sheet can be butt-jointed surely and strongly without causing problems of crinkle and joint stagger, irrespectively of whether the elastic sheet is soft or not.

According to one aspect of the present invention, a method for butt-jointing edges of an elastic material sheet comprises the steps of supporting two edges portions of at least one sheet made from an elastic material such that the two edges thereof to be butt-jointed are oppositely opposed, drawing surfaces of the two edges portions toward the center between the two edges by contacting a pair of counterrotating conical surfaces with the respective edges portions, while moving the conical surfaces along the two edges, whereby the oppositely opposed two edges come into contact with each other to make a butt-joint, wherein a small space is formed between the conical surfaces so that the elastic material accumulated in the small space forms a small rib-like protrusion along the butt-joint after the conical surfaces pass over, and pressing down the small rib-like protrusion to flatten the butt-joint.

According to another aspect of the present invention, an apparatus for butt-jointing edges of an elastic material sheet comprises a supporter for supporting at least one sheet made from an elastic material such that two edges of said at least one sheet to be butt-jointed are oppositely opposed, a jointer comprising a pair of conical rotators, and a traverser for moving the jointer along the two edges, wherein the paired conical rotators each have an outer surface which is defined as a conical surface of a truncated right circular cone having a large diameter edge and a small diameter edge, and the paired conical rotators are arranged such that: the rotational axes thereof are placed in a plane and intersect with each other so that the large diameter edges are adjacent to each other; the conical surfaces each have a general line to contact with the surface of the sheet; and the general lines of the two conical surfaces are inclined to the opposite direction to the moving direction of the jointer towards both sides from the center between the conical surfaces so as to draw the contact surface of the sheet toward the center, wherein, a small space is provided between said adjacent large diameter edges so as to enable the elastic material to be accumulated therein, whereby, when the jointer is moved along the two edges, the paired conical rotators draw the two edges towards the center to butt-joint the edges, and the elastic material accumulated in the small space forms a small rib-like protrusion along the butt-joint after the conical rotators pass over, wherein the apparatus further comprises a means for pressing down the small rib-like protrusion to flatten the surface of the butt-joint.

Therefore, at the butt-joint interface, the elastic material irregularly interfuses as the small protrusion is pressed down, and the boundary faces are strongly tied each other. As a result, the strength of the butt-joint can be increased, without the need to increase the force to draw the edges and push together.

DESCRIPTION OF THE PREFERRED EMBODIMENTS

Figure 1:
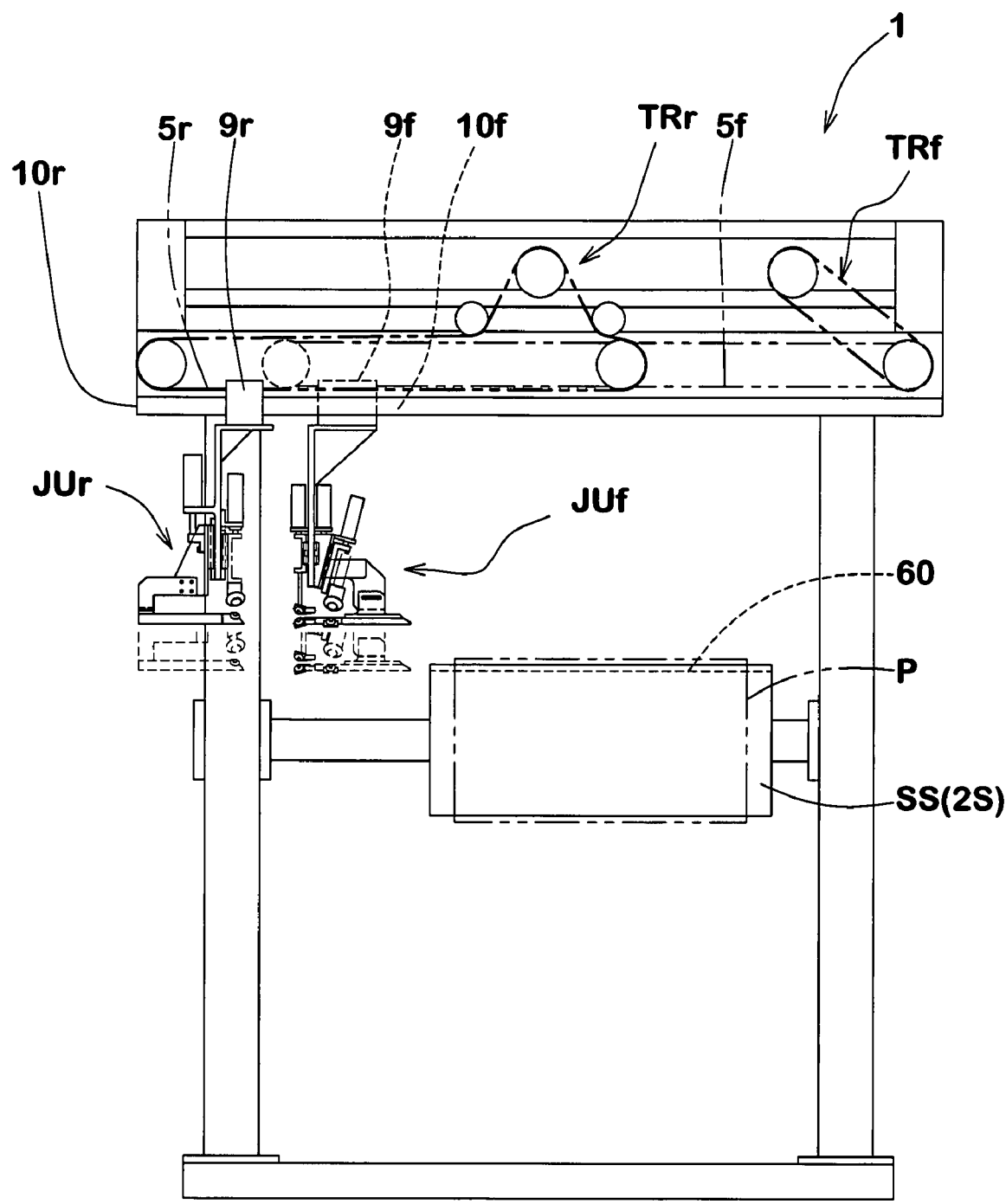
FIG. 1 is a side view of an apparatus for butt-jointing edges of an elastic material sheet according to the present invention.

Embodiments of the present invention will now be described in detail in conjunction with the accompanying drawings.

In the drawings, apparatus 1 for butt-jointing edges of an elastic material sheet according to the present invention is used in a process of building an uncured pneumatic tire.

* Elastic Sheet P

The elastic sheet P to be butt-jointed is made from a sticky elastic material.

In this embodiment, the elastic sheet P is a sheet of uncured rubber (g) in which reinforcing cords (c) are embedded in parallel with each other, and the sheet P is used to form a carcass ply of a pneumatic tire. The uncured rubber sheet P is cut into a predetermined width Wp and a length so that the edges PE (the ends in the lengthwise direction) extend in parallel with the embedded cords (c).

In order that the rubber sheet P forms a cylinder hollow, the sheet P is wound almost once around a tire building drum so that the edges PE almost contact with each other or a very small gap G is formed therebetween. Then, the edges PE are butt-jointed.

The drum SS has a cylindrical outer surface 2S onto which the sheet P is directly or indirectly applied. In the illustrated example, the cords (c) in the wound sheet P are parallel with the rotational axis of the drum SS because the carcass ply is a radial ply of a radial tire. Accordingly, the edges PE (gap G) of the wound sheet extend parallel with the rotational axis of the drum SS.

In the outer surface 2S, a hollow or groove 60 which forms a path for the undermentioned support plates SPf and SPr and the lower conical rotators CRl is provided so as to extend in parallel with the rotational axis. In the case that the cords (c) or the edges PE are inclined at a small angle, however, the groove 60 can be inclined correspondingly or made wider enough to move the support plate SP and lower conical rotators CRl obliquely within the groove width.

Incidentally, an uncured innerliner (not shown) made form an air-impermeable rubber such as butyl rubber which forms an air-tight layer covering the inner surface of the tire can be disposed on the underside of the rubber sheet P.

* Apparatus 1

The apparatus 1 comprises: a supporter SS for an elastic material sheet P; two jointer units JU (JUf and JUr); and two traversers TR (TRf and TRr). Each traverser TR (TRf and TRr) comprises: a slide guide 4 (4f, 4r) for the jointer unit JU; an endless flexible member 5 (5f, 5r); and a driving motor M (Mf, Mr). Each jointer unit JU includes at least one jointer J (J1, J2, J3). Each jointer J comprises: a pair of upper conical rotators CRu; and a pair of lower conical rotators CRl.

In this embodiment, the apparatus 1 constitutes a part of a raw tire building machine, and the sheet supporter SS is the above-mentioned tire building drum used in manufacturing the tire.

For the sake of convenience of explanation, the left side and right side of the view shown in FIG. 1 are treated as the rear side and front side, respectively, and various positions and directions are referred to, based on such assumption. The suffixes "f" and "r" to the jointer units JU, traversers TR, slide guides 4, endless flexible members 5, driving motors M, shifters FT, and support plate SP mean "front" and "rear", respectively. The suffixes "u" and "l" to the conical rotators CR mean "upper" and "lower" respectively.

The main reason for using two jointer units JUf and JUr is to prevent occurrence of crinkle and stagger rather than to share the burden of the jointing operation. When butt-jointing the edges PE, the two units start from a middle position Q of the length of the edges PE towards the opposite directions. One of the jointer units JU is to butt-joint the edges PE, moving from the position Q to the front end Pf of the edges PE (hereinafter the front jointer unit JUf). The other is to butt-joint the edges PE, moving from the position Q to the rear end Pr of the edges PE (hereinafter the rear jointer unit JUr).

Figure 2:
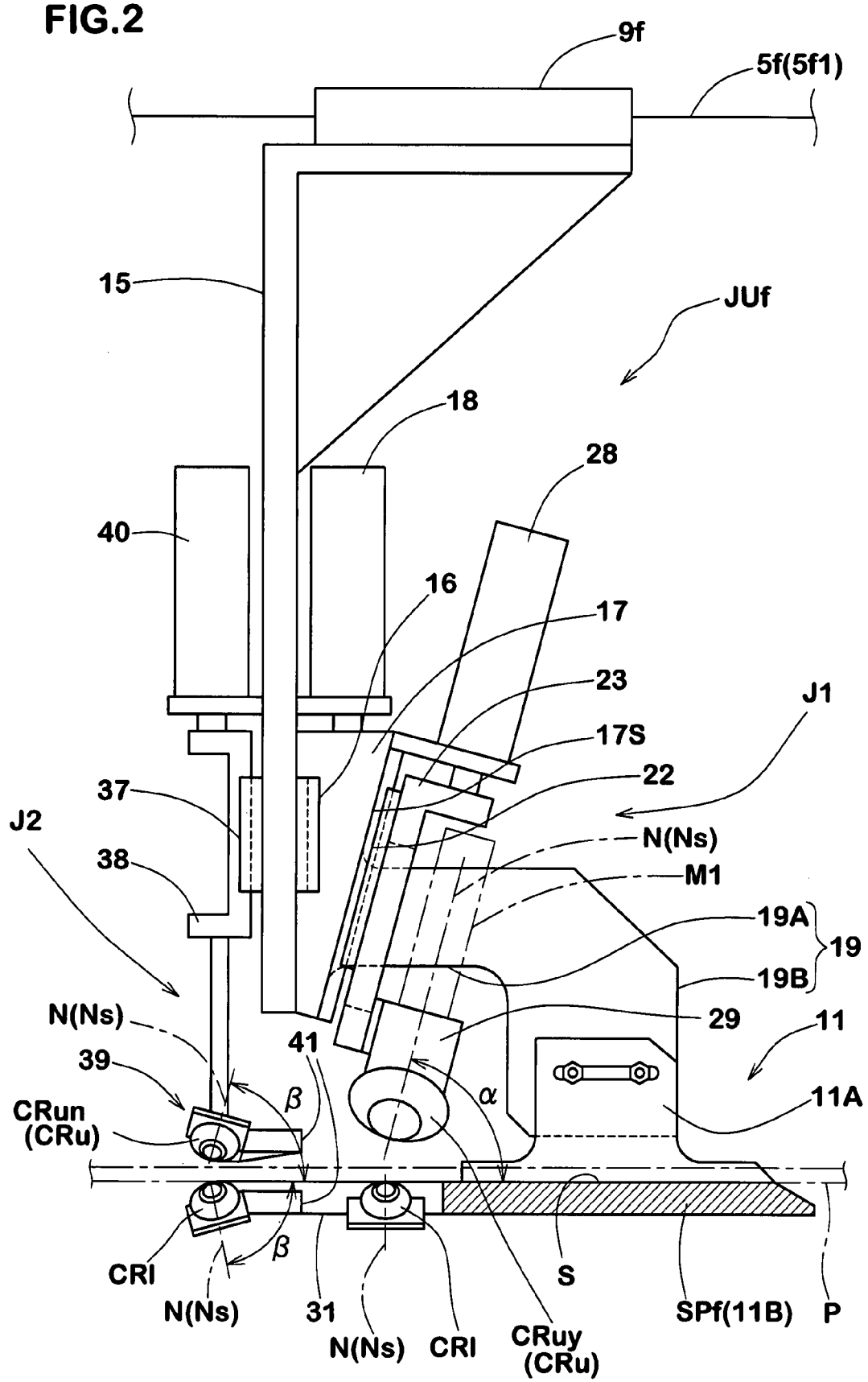
FIG. 2 is a side view of a front jointer unit thereof.
Figure 3:
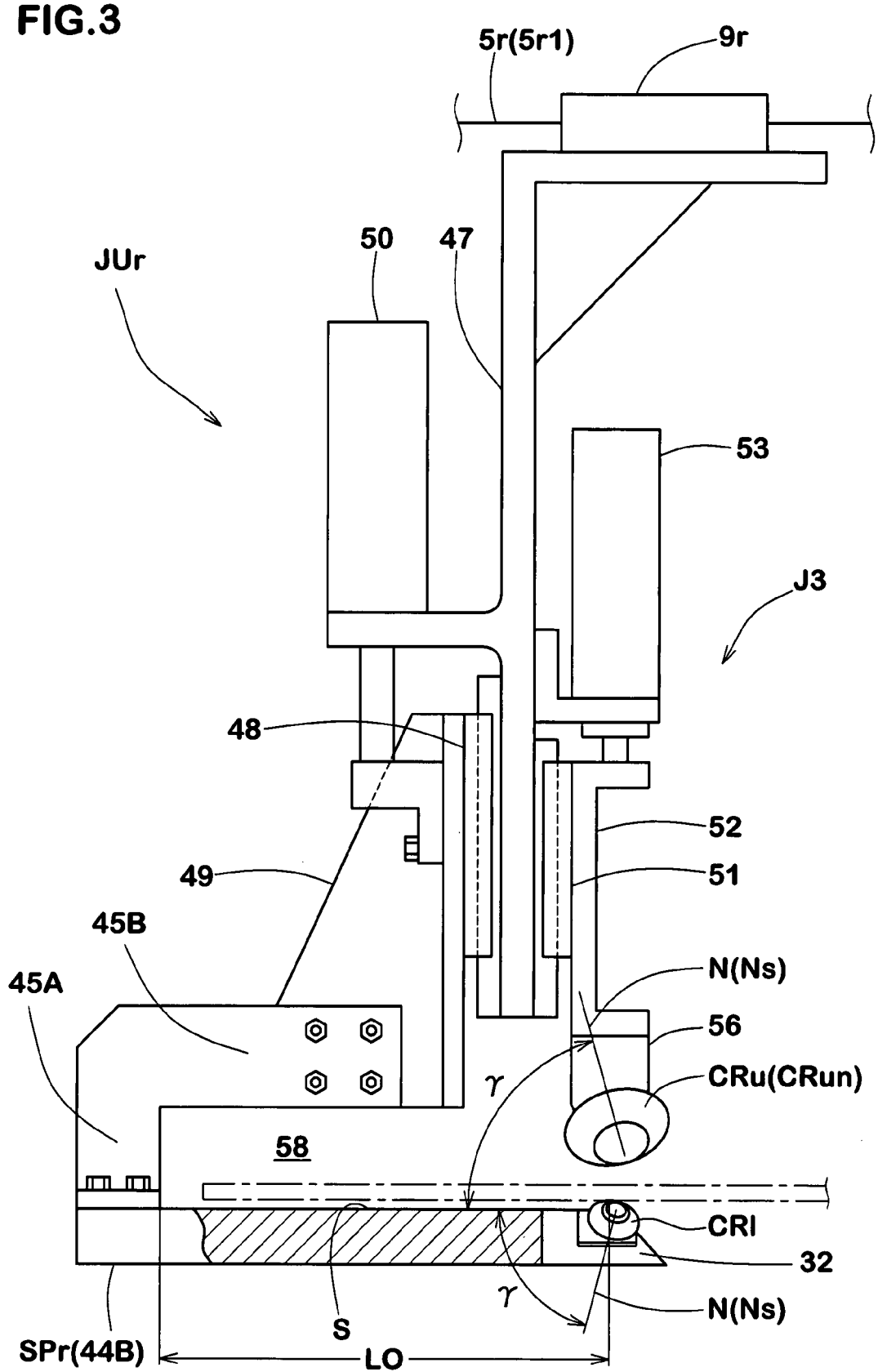
FIG. 3 is a side view of a rear jointer unit thereof.

The rear jointer unit JUr in this example is constructed to joint the edges as short as possible with a relatively large drawing force, and this unit JUr includes one jointer J3 as shown in FIG. 3. The front jointer unit JUf in this example is constructed to joint the edges as long as possible with a relatively small drawing force, and this unit JUf includes two jointers J1 and J2 as shown in FIG. 2. In order to make up for the small drawing force, the undermentioned less-tapered surfaces 26 are provided so that a rib-like protrusion (g1) is once formed along the butt-joint. Then, the rib-like protrusion is flattened by pressing down so that the contact between the edges PE is tightened, and the joint strength is increased.

* Traverser TR

In order to enable the two jointer units JUf and JUr to move independently along the edges PE, the front traverser TRf for the front jointer unit JUf and the rear traverser TRr for the rear jointer unit JUr, are disposed above the sheet supporter (drum) SS as shown in FIG. 1.

Figure 4:
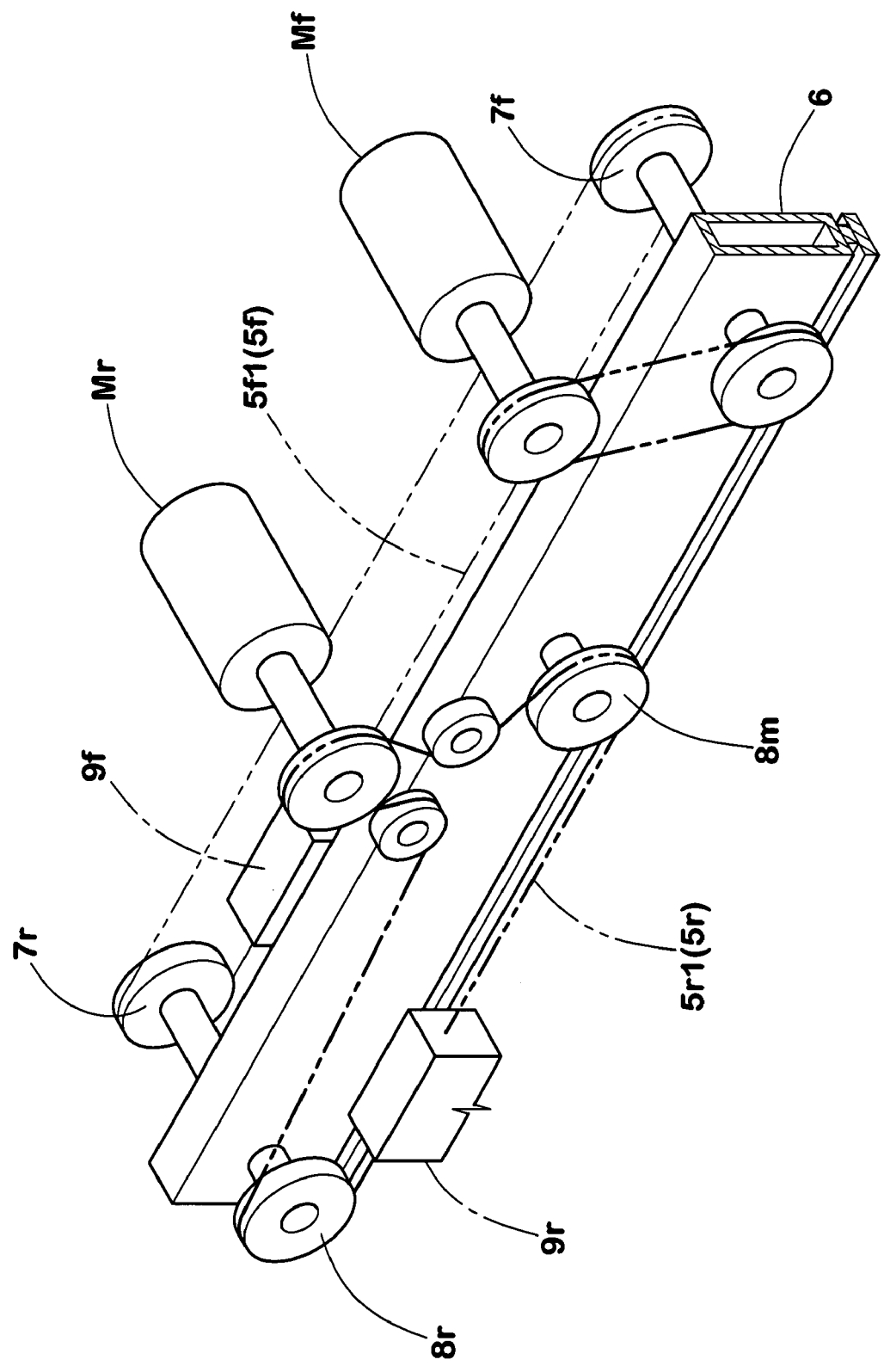
FIG. 4 is a perspective view of a traverser thereof.

In this embodiment, the endless flexible member 5f, 5r is an endless chain. As shown in FIG. 4, the slide guide 4f, 4r comprises a carriage 9f, 9r capable of running on a track 10f, 10r provided along a transversal frame 6. The transversal frame 6 extends between two vertical frames horizontally in the back and forth direction over the drum SS as shown in FIG. 1. The carriage 9f, 9r is slidable in the back and forth direction.

The front traverser TRf is disposed on one side of the transversal frame 6, and the endless chain 5f is wound between a pair of chain wheels 7f and 7r rotatably fitted on a front end portion and a rear end portion of the transversal frame 6. The chain 5f is driven by a geared motors Mf mounted on the frame 6. The carriage 9f is coupled on the lower part 5f1 of the chain 5f.

The rear traverser TRr is disposed on the other side of the transversal frame 6, and the endless chain 5r is wound between a chain wheel 8r rotatably fitted on the rear end portion of the transversal frame 6 and a chain wheel 8m rotatably fitted on the middle portion of the transversal frame 6. The chain 5r is driven by a geared motors Mr mounted on the frame 6. The carriage 9r is coupled on the lower part 5r1 of the chain 5r.

* Conical Rotators CR

The conical rotators CRu and CRl each have a rotational axis N and each comprise a conical main part 24 and a miter gear part 25 which parts 24 and 25 are concentric about the rotational axis N.

The conical main part 24 is defined as being tapered and having an outer surface 24S which is a conical surface of a truncated right circular cone.

The miter gear part 25 is defined as being toothed and formed on the large diameter side of the conical outer surface 24S.

The paired conical rotators (CRu and CRu), (CRl and CRl) are assembled in one unit so that the two rotational axes N become orthogonal and the two miter gear parts 25 are engaged with each other as miter gears. Accordingly, when one of the two rotators is rotated, the two rotators rotate in the counter directions at the same rotational speed.

\* Less-Tapered Surface 26

Figure 5:
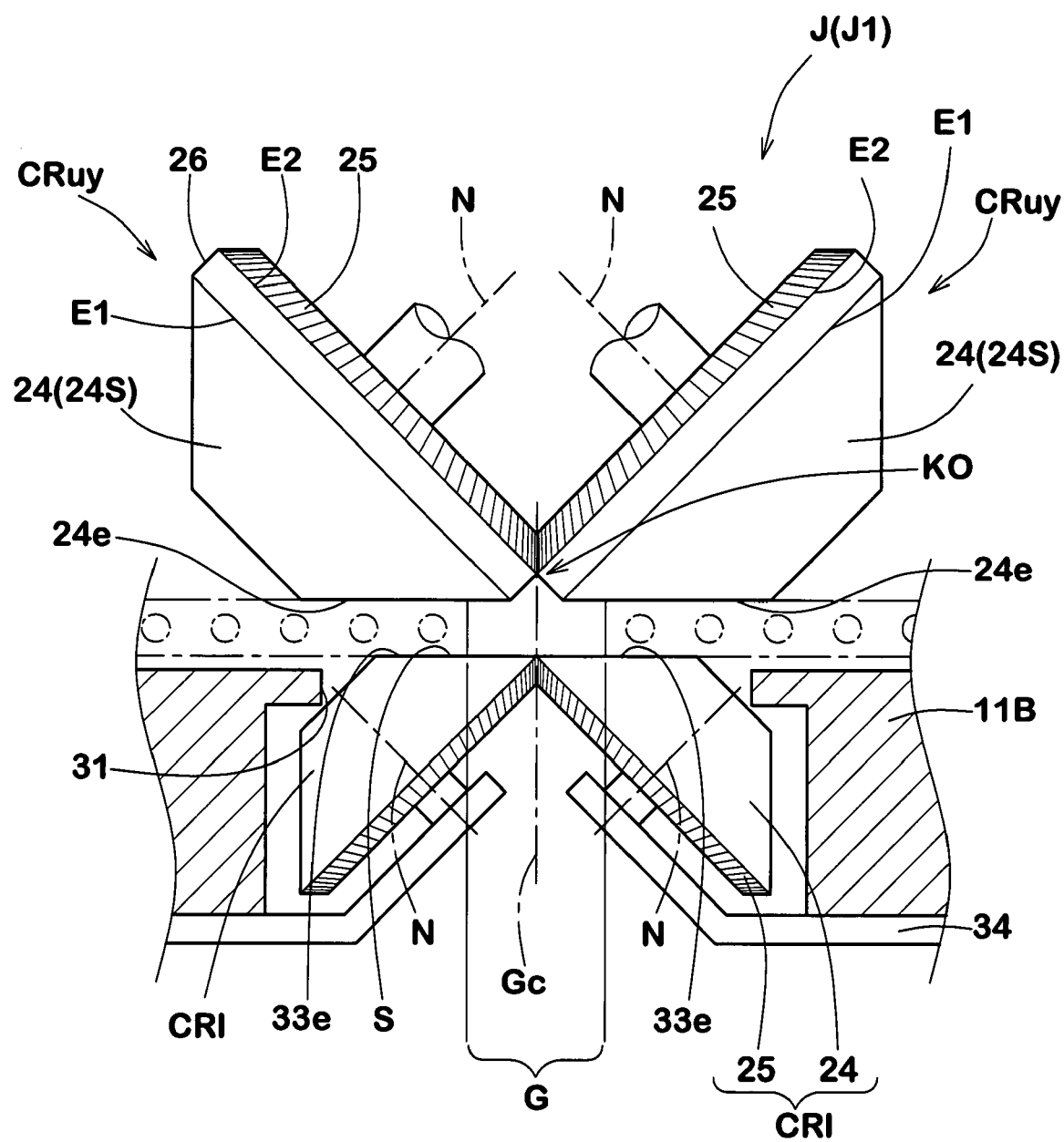
FIG. 5 is a partial front view of a primary jointer of the front jointer unit showing an arrangement of conical rotators in operation.

At least one pair of the conical rotators CR of the two jointer units JUf and JUr are each provided with a surface 26 less tapered than the conical outer surface 24S as shown in FIG. 5.

The less-tapered surface 26 is positioned between the conical outer surface 24S and the miter gear part 25 so that the less-tapered surface 26 intersects the conical outer surface 24S at the large diameter edge thereof. The less-tapered surface 26 has two edges E1 and E2, one edge E1 is the same as the large diameter edge of the conical outer surface 24S, and the other edge E2 is the opposite edge adjacent to the miter gear part 25.

In the case of the conical rotators CR provided with the less-tapered surfaces 26, as shown in FIG. 5, the edges E2 of the two surfaces 26 are circumscribed at a contacting point K0.

Figure 6:
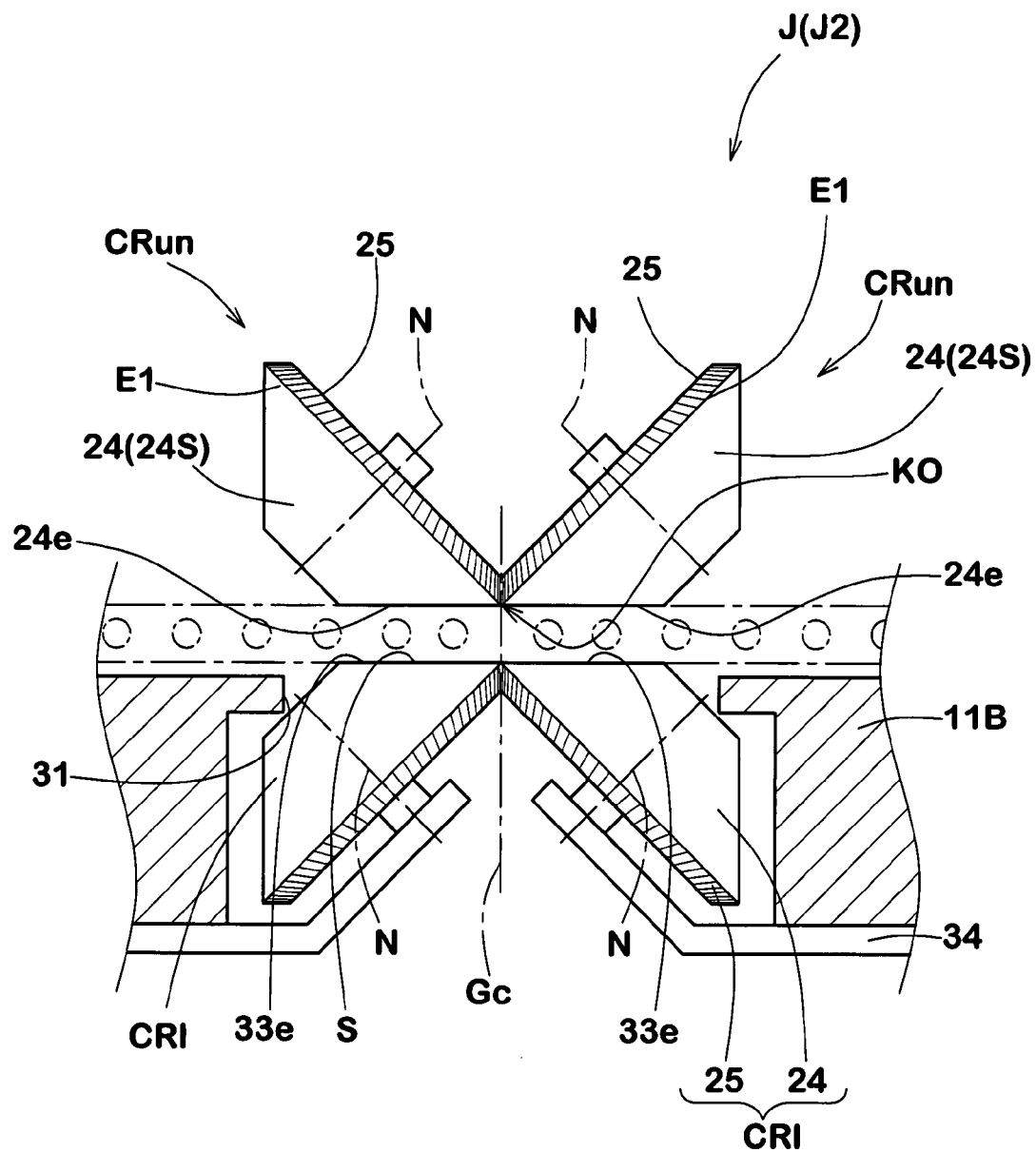
FIG. 6 is a partial front view of a secondary jointer of the front jointer unit showing an arrangement of conical rotators in operation.
Figure 7:
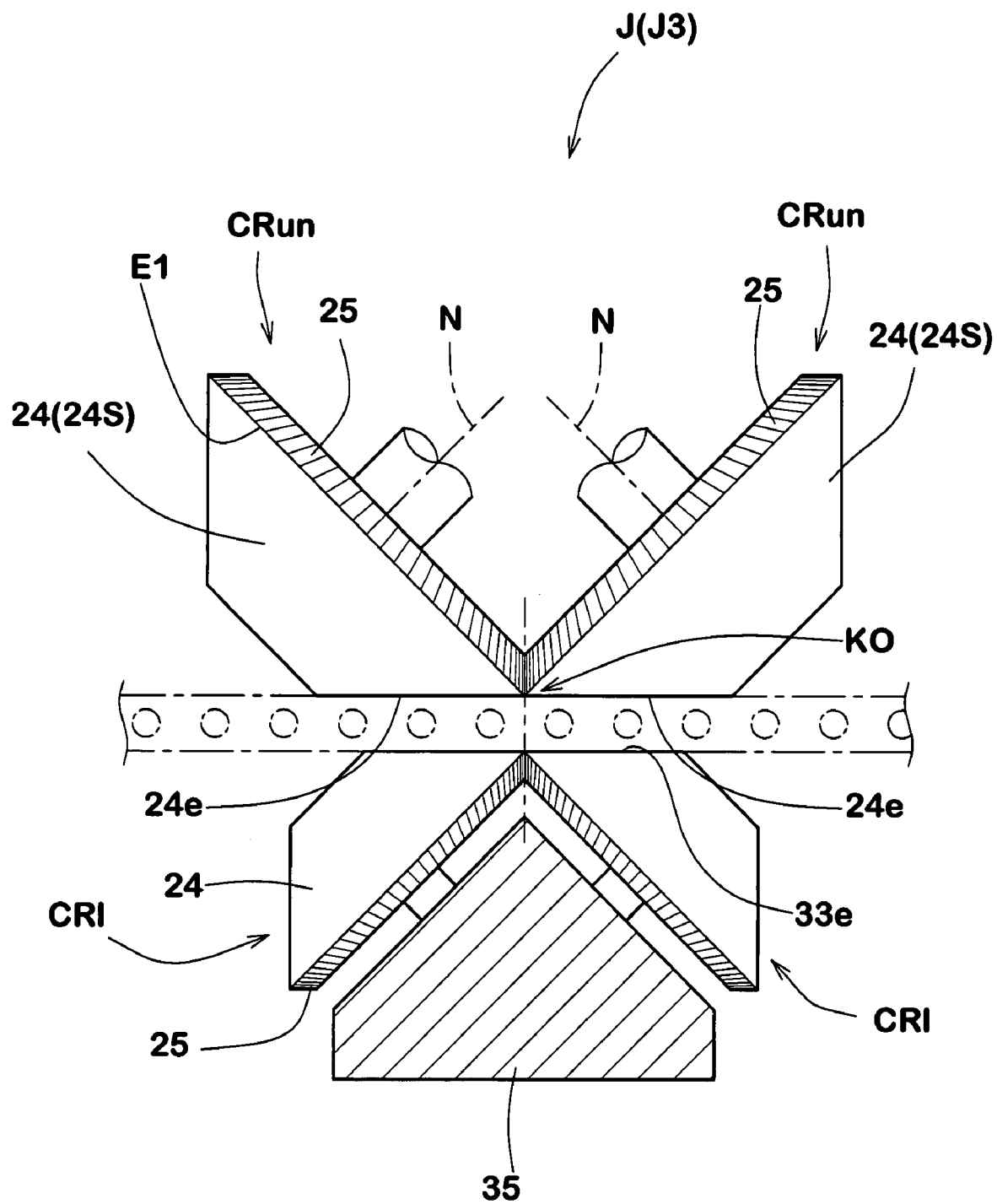
FIG. 7 is a partial front view of a jointer of the rear jointer unit showing an arrangement of conical rotators in operation.

In the case of the conical rotators CR not provided with such less-tapered surfaces, as shown in FIGS. 5-7, the large diameter edges E1 of the two conical outer surfaces 24S are circumscribed at a contacting point K0.

In any case, the contacting point K0 is positioned at the center Gc of the gap G or between the edges PE. Further, in the case of the paired upper conical rotators CRu, the lowermost two general lines 24e of the two conical outer surfaces 24S have to be parallel with and at the same level as the upper surface of the sheet P when in the jointing operation. On the other hand, in the case of the paired lower conical rotators CRl, the uppermost two general lines 33e of the two conical outer surfaces 24S have to be parallel with and at the same level as the under surface of the sheet P when in the jointing operation.

In this embodiment, the less-tapered surfaces 26 are provided on the upper conical rotators CRu. Therefore, the upper conical rotators CRu with the less-tapered surface is hereinafter referred to as "CRuy", and without the less-tapered surface as "CRun" according to need.

\* Front Jointer Unit JUf

In the front jointer unit JUf, as shown in FIG. 2, the primary jointer J1 comprises the upper conical rotators CRuy with the less-tapered surfaces 26, and the lower conical rotators CRl without the less-tapered surfaces. The secondary jointer J2 comprises the upper conical rotators CRun without the less-tapered surfaces, and the lower conical rotators CRl without the less-tapered surfaces.

A fixed frame 15 is fixed to the above-mentioned carriage 9f and dropped therefrom. A cylinder 40 is flange-mounted on the fixed frame 15. A movable frame 38 is attached to the fixed frame 15 slidably up and down with a linear guide 37 such as a linear bearing. The movable frame 38 is connected to the lower end of the piston rod of the cylinder 40 so that the frame 38 is moved vertically by the extension and retraction of the rod.

Further, a cylinder 18 is flange-mounted on the fixed frame 15 on the opposite side (front) of the cylinder 18. A movable frame 17 is attached to the fixed frame 15 slidably up and down with a linear guide 16 such as a linear bearing. The movable frame 17 is connected to the lower end of the piston rod of the cylinder 18 so that the frame 17 is moved vertically by the extension and retraction of the rod. The vertically movable frame 17 has an anteverted front surface 17S.

Figure 8:
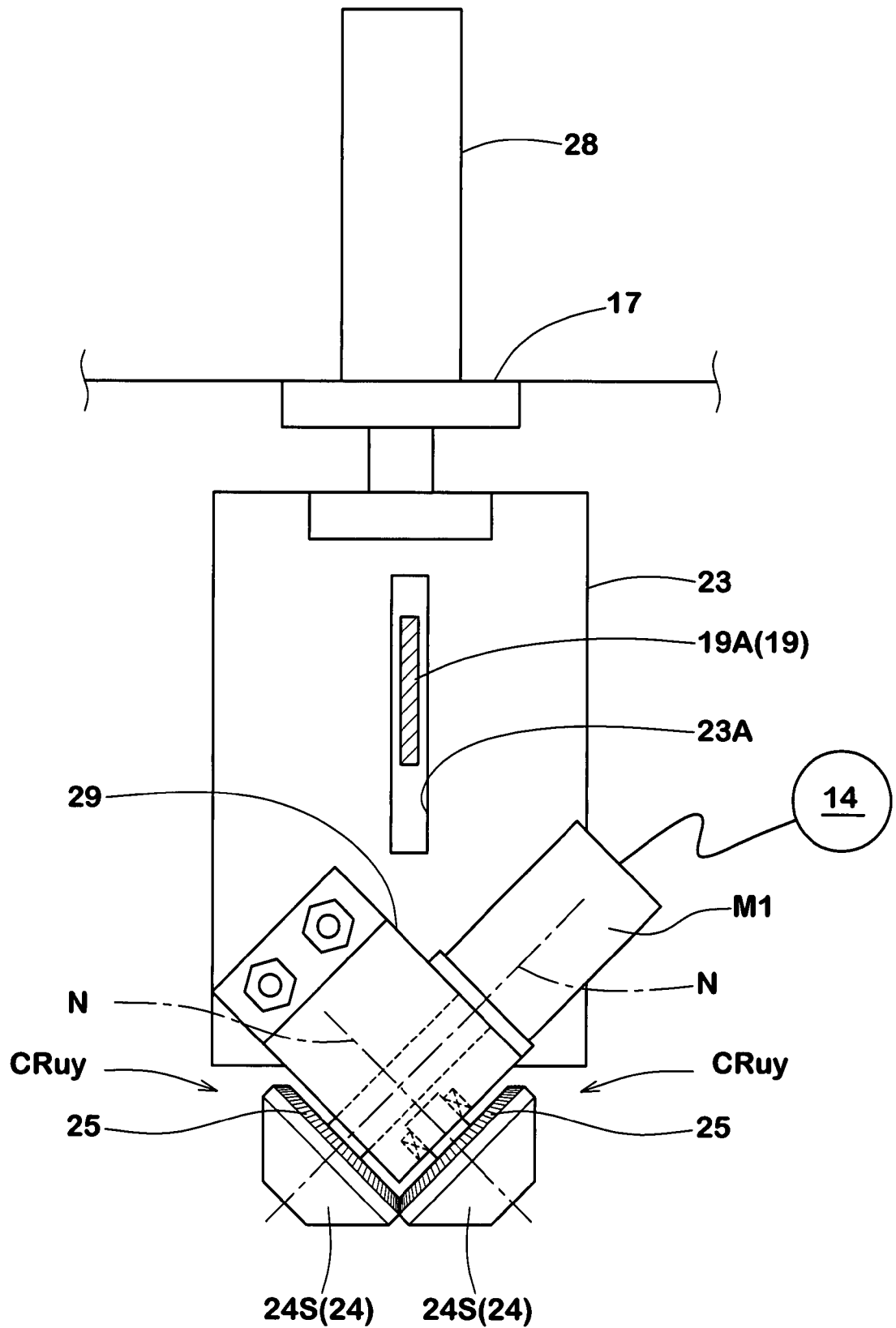
FIG. 8 is a front view of the primary jointer of the front jointer unit.

A cylinder 28 is flange-mounted on the movable frame 17 in parallel with the anteverted front surface 17S. An oblique movable frame 23 is attached to the movable frame 17 slidably up and down along the surface 17S with a linear guide 22 such as a linear bearing. The oblique movable frame 23 is connected to the lower end of the piston rod of the cylinder 28 so that, by the extension and retraction of the rod, the frame 23 is moved up and down in parallel with the front surface 17S. The obliquely movable frame 23 is provided with a vertical slot 23A as best shown in FIG. 8.

The vertically movable frame 17 is fixedly provided with a suspending plate 19. The suspending plate 19 has a part 19A protruding from the front surface 17S through the vertical slot 23A, and a part 19B turning down at the front end of the protruding part 19A, thereby having an L-shaped side view.

Figure 9:
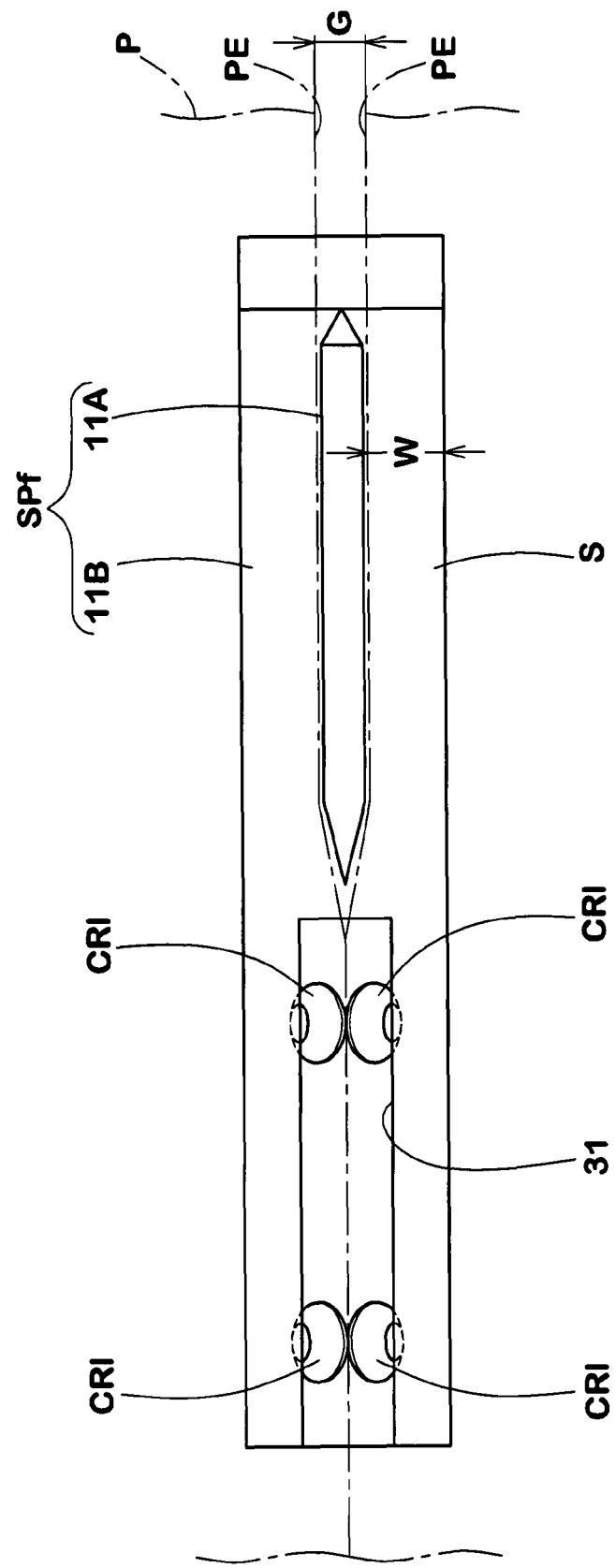
FIG. 9 is a top view of the sheet supporting plate of the front jointer unit.

The support plate SPf is fixed to the suspending plate 19. The support plate SPf comprises, as shown in FIG. 2 and FIG. 9, a main part 11B and an upright plate 11A.

The main part 11B is a narrow long plate whose upper surface forms a face S receiving and supporting the underside of the rubber sheet P near the edges PE.

The upright plate 11A protrudes upward from the upper surface of the main part 11B along the widthwise center line thereof. Thus, when viewed from the front, the support plate SPf has a reversed T-shape. The upper end of the upright plate 11A is bolted at the lower end of the turndown part 19B of the suspending plate 19.

Therefore, accompanying the vertically movable frame 17, the support plate SPf is movable in the up and down direction.

The support plate SPf can move down to a lower position at which the sheet supporting face S is positioned at the same level as the under surface of the sheet P. At this lower position, the upright plate 11A extends upward through between the edges PE to be butt-jointed.

In order to effectively support the edges PE, the width W of the sheet supporting face S measured beside the upright plate 11A as shown in FIG. 9 is preferably at least 6.0 mm. The front end of the face S is down sloped. A rectangular cutout 31 is formed on the rear side of the upright plate 11A so as to extend to the rear end of the face S along the widthwise center line thereof.

\* Rear Jointer Unit JUr

In the rear jointer unit JUr, as shown in FIG. 3, the jointer J3 comprise the upper conical rotators CRun without the less-tapered surfaces 26, and the lower conical rotators CRl without the less-tapered surfaces.

A fixed frame 47 is fixed to the above-mentioned carriage 9r and dropped therefrom. A cylinder 50 is flange-mounted on the fixed frame 47. A movable frame 49 is attached to the fixed frame 47 slidably up and down with a linear guide 48 such as a linear bearing. The movable frame 49 is connected to the lower end of the piston rod of the cylinder 50 so that the frame 49 is moved vertically by the extension and retraction of the rod.

A cylinder 53 is flange-mounted on the fixed frame 47. A movable frame 52 is attached to the fixed frame 47 slidably up and down with a linear guide 51 such as a linear bearing. The movable frame 52 is connected to the lower end of the piston rod of the cylinder 53 so that the frame 52 is moved vertically by the extension and retraction of the rod.

The support plate SPr comprises a main part 44B as shown in FIG. 3. The main part 44B is a narrow long plate whose upper surface forms the face S receiving and supporting the underside of the sheet P near the edges PE.

The support plate SPr is fixed to the vertically movable frame 49 with a suspending plate 45. The suspending plate 45 comprises a part 45B protruding rearward from the vertically movable frame 49, and a part 45A turning down at the rear end of the part 45B. Thus, it has a L-shaped side view as shown in FIG. 3. The rear end of the main part 44B of the support plate SPr is bolted on the lower end of the turndown part 45A. Therefore, accompanying the vertically movable frame 49, the support plate SPr is movable in the up and down direction.

The support plate SPr can move down to a lower position at which the sheet supporting face S is positioned at the same level as the under surface of the sheet P.

* Lower Conical Rotators CRl

In the front jointer unit JUf and rear jointer unit JUr, the lower conical rotators CRl are mounted on the respective support plates SPf and SPr with mounting frames 34 and 35 including bearings so that the above-mentioned uppermost general lines 33e of the conical surfaces 24S become at the same level as the sheet supporting face S of the support plates SP. Accordingly, in each jointer unit JU, the lower conical rotators CRl are moved up and down together with the support plate SP.

In the case of the front jointer unit JUf, two pairs of the lower conical rotators CRl are disposed within the above-mentioned cutout 31 as shown in FIG. 9.

In the case of the rear jointer unit JUr, similarly, a relatively small cutout 32 is formed in the front end portion of the support plate SPr, and one pair of the lower conical rotators CRl are disposed therein as shown in FIG. 3.

* Upper Conical Rotators CRu,

As to the upper conical rotators CRu, in the case of the rear jointer unit JUr, the conical rotators CRu are mounted on the vertically movable frame 52 with a mounting frame 56 including bearings.

In the case of the front jointer unit JUf, the conical rotators CRun are mounted on the vertically movable frame 38 with a mounting frame 55 including bearings. The conical rotators CRuy are mounted on the obliquely movable frame 23 with a mounting frame 39 including bearings.

As shown in FIG. 8, one of the two conical rotators CRuy is couple with a geared motor M1 mounted on the obliquely movable frame 23. Therefore, when the motor M1 is powered, the two main conical rotators CRuy rotate at the same speed.

In this embodiment, only the conical rotators CRuy of the front jointer unit JUf are motor-driven. The others are not motor-driven and they are rotated by frictional force between the moving sheet P and conical surfaces 24S.

* Shifters

In this example, therefore, the cylinder 40, movable frame 38 and linear guide 37 constitute a vertical shifter for the paired upper conical rotators CRu of the jointer J2.

The cylinder 18, movable frame 17 and linear guide 16 constitute a vertical shifter for two pairs of the lower upper conical rotators CRu of the two jointers J1 and J2 and also for the support plate SPf.

The cylinder 28, movable frame 23 and linear guide 22 constitute an oblique shifter for the paired upper conical rotators CRu of the jointer J1.

The cylinder 50, movable frame 49 and linear guide 48 constitute a vertical shifter for the lower conical rotators CRl and support plate SPr of the jointer J3.

The cylinder 53, movable frame 52 and linear guide 51 constitute a vertical shifter for the upper conical rotators CRun of the jointer J3.

* Arrangements of Conical Rotators

In the case of the front jointer unit JUf where the butt-jointing operation is carried out moving toward the front (right side in FIG. 2), the upper rotators CRuy of the jointer J1, and the upper and lower rotators CRun and CRl of the jointer J2, are inclined toward the front, namely the traveling direction such that, in the operating state or position, the inclination angle (alpha, beta) of the plane Ns including the two rotational axes N of each pair of rotators is in a range of less than 90 degrees, preferably not more than 80 degrees, but not less than 60 degrees, preferably not less than 70 degrees with respect to the sheet supporting face S.

The lower rotators CRl of the jointer J1 are however, substantially not inclined, and the plane Ns including the two rotational axes N is substantially perpendicular to the sheet supporting face S.

In the case of the rear jointer unit JUr where the butt-jointing operation is carried out moving toward the rear (left side in FIG. 3), the upper rotators CRun and the lower rotators CRl of the jointer J3 are inclined toward the rear, namely the traveling direction such that, in the operating state or position, the inclination angle (gamma) of the plane Ns including the two rotational axes N of each pair of rotators is in a range of less than 90 degrees, preferably not more than 80 degrees, but not less than 60 degrees, preferably not less than 70 degrees with respect to the sheet supporting face S.

In this example, the angles alpha, beta and gamma are 75 degrees, and the above-mentioned obliquely movable frame 23 is inclined at the same angle alpha, and accordingly, the frame 23 can move the upper conical rotators CRuy while maintaining the plane Ns at the inclination angle alpha.

Figure 10:
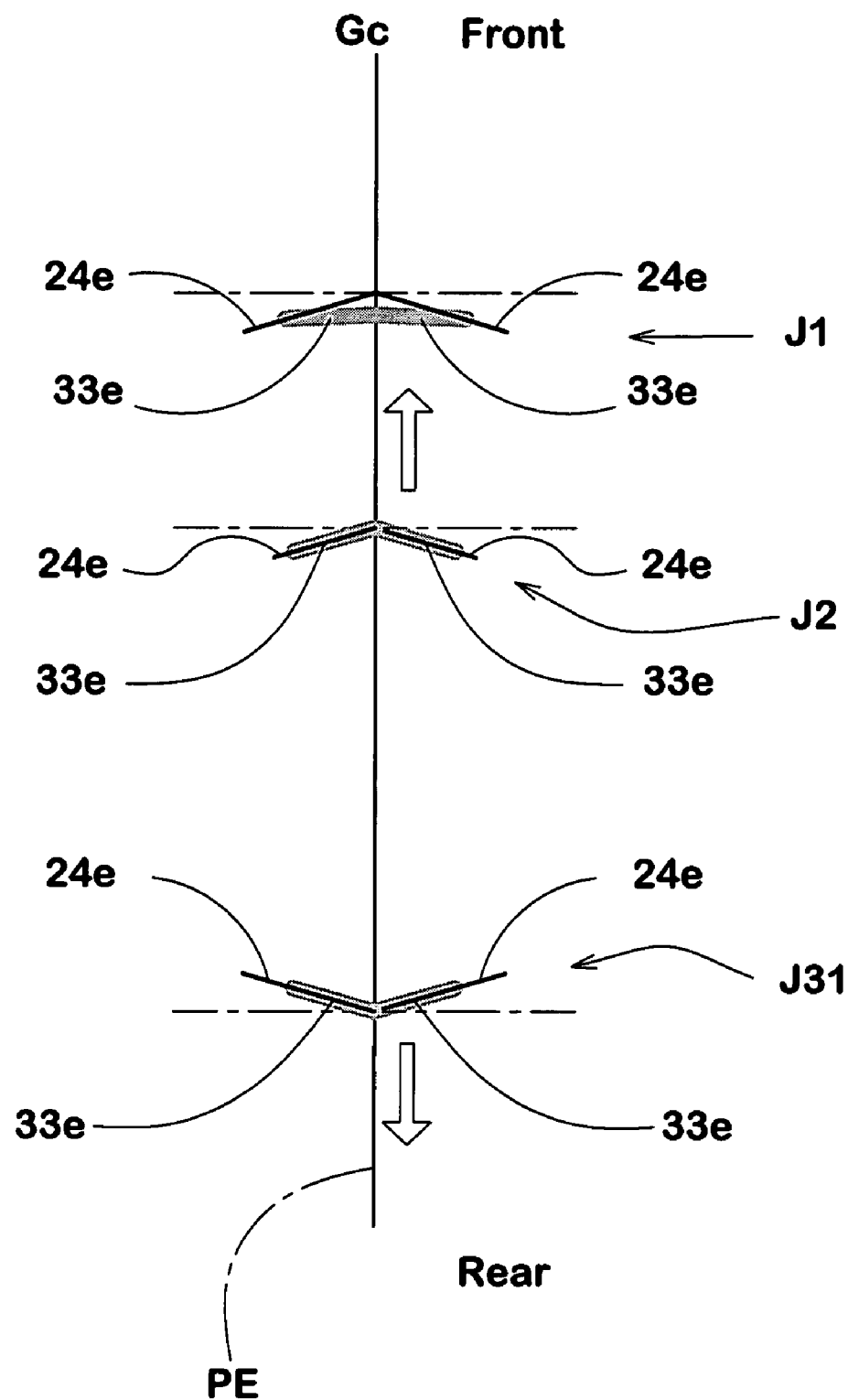
FIG. 10 is a diagram for explaining the arrangement of the conical rotators.

When butt-jointing the edges PE, the upper conical rotators CRu come down so that the lowermost general lines 24e thereof can contact with the upper surfaces of the sheet of which under surfaces are supported by the lower conical rotators CRl. In this condition, therefore, it is necessary that the lower conical rotators CRl are positioned just beneath the respective upper conical rotators CRu such that in each pair of one upper conical rotator and one lower conical rotator, as shown in FIG. 10 their lowermost general line 24e and the uppermost general line 33e are in parallel with each other (like in the jointers J2 and J3) or intersect with each other (like in the jointer J1).

Here, due to the inclination of the plane Ns of the paired two rotators, the general lines 24e, 33e thereof lying within a horizontal plane are inclined to the opposite direction to the inclining direction of the plane Ns. Accordingly, the centripetal drawing force is increased.

* Function of Less-Tapered Surfaces 26

In the case of the paired conical rotators CR with the less-tapered surfaces 26, a space 27 having a triangular cross section is formed between the two less-tapered surfaces 26.

Therefore, when the upper conical rotators CRuy are rotated by the motor M1, while traversing the sheet, the edges PE of the sheet are drawn toward the center Gc, and the rubber (g) of the upper surface of the sheet P is accumulated in the space 27. As a result, a rib-like small protrusion (g1) is formed on the upper surface of the rubber sheet P along the but-joint.

In order to flatten the protrusion (g1), the jointer J2 including the upper conical rotators CRun without the less-tapered surfaces shown in FIG. 6 is positioned rearward of the jointer J1. Thus, when passing through the upper conical rotators CRun of the jointer J2, the protrusion (g1) is pressed down and the butt-joint part is evened. At the same time, the edges PE are pressed against each other by the upper and lower conical rotators of the jointer J2 to ensure the butt-jointing.

Figure 11:
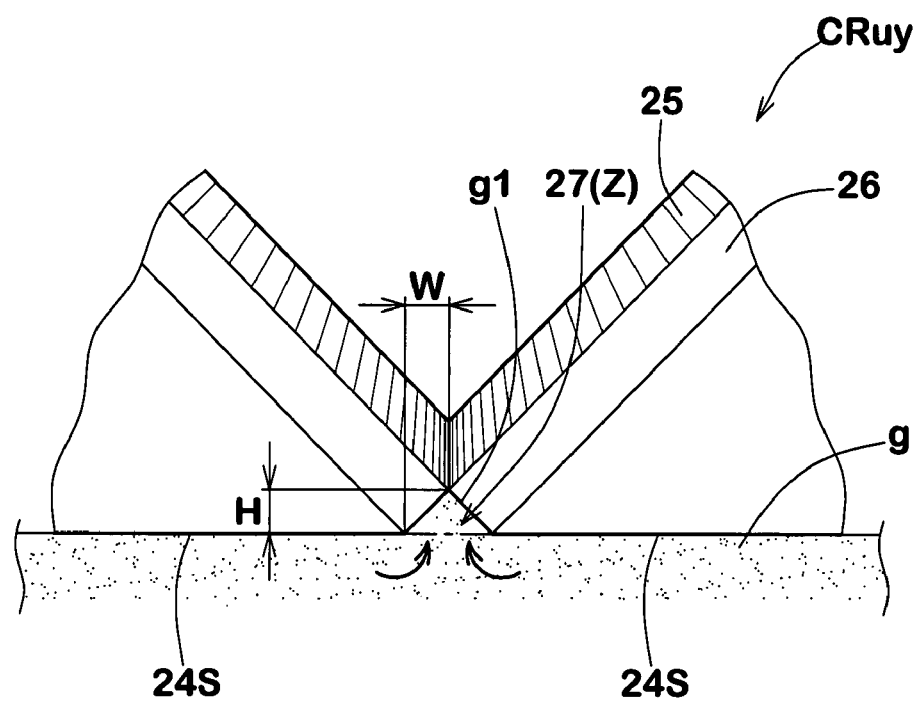
FIG. 11 is a front view of the paired conical rotators provided with less-tapered surfaces for explaining the formation of a rib-like protrusion.

For that purpose, preferably, the space 27 has a cross sectional area Z of not more than 1.0 sq.mm, more preferably not more than 0.50 sq.mm, but not less than 0.02 sq.mm, more preferably not less than 0.1 sq.mm, when viewed in parallel with the back and forth direction as shown in FIG. 11. In the case that the sheet P has a thickness of about 0.5 to 2.0 mm, the width W of the less-tapered surface 26 is in a range of not less than 0.2 mm, preferably not less than 0.3 mm, more preferably not less than 0.5 mm, but, not more than 1.0 mm. The height H of the less-tapered surface 26 is in a range of not less than 0.2 mm, preferably not less than 0.35 mm, but, not more than 1.0 mm, preferably not more than 0.70 mm.

Figure 12:
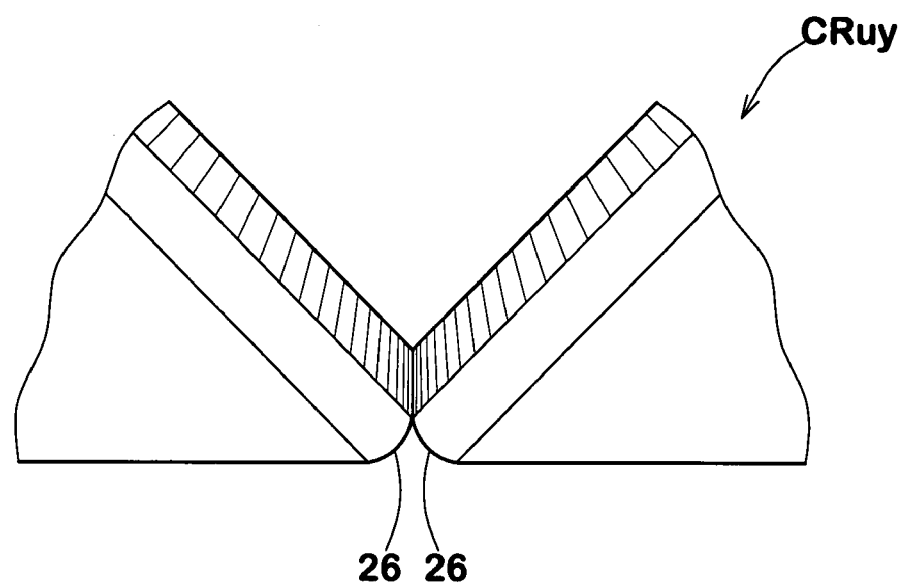
FIG. 12 is a front view of the paired conical rotators showing another example of the less-tapered surfaces.

The less-tapered surface 26 in this example has a linear taper. But, it is also possible that the less-tapered surface 26 has a nonlinear taper as shown in FIG. 12, wherein the surface 26 is curved convexly. In this case, as the tip of the protrusion becomes very thin and thus unstable. Accordingly, when pressed down, it is uncertain whether the protrusion collapses rightward or leftward. Therefore, the interfusion of the uncured rubber at the butt-joint interface is furthered, and as a result, the joint strength is further increased.

In this embodiment, the motor-driven upper conical rotators CRuy of the jointer J1 have a larger diameter than the non-driven lower conical rotators CRl of the jointer J1 so as to steadily draw or pull the edge portions of the sheet without causing crinkle. In the jointer J3, for the same reason, the upper conical rotators CRu have a larger diameter than the lower conical rotators CRl. In the jointer J2, the upper conical rotators CRu have a substantially same diameter as the lower conical rotators CRl.

Incidentally, as shown in FIG. 2, just ahead of the upper and lower conical rotators CRu and CRl of the secondary jointer J2, guide plates 41 are provided to guide the lower and under sides of the rubber sheet P entering between the upper rotators and lower rotators.

\* Method

The operation of the apparatus 1 and a method of buttjointing the edges PE will be described in conjunction with FIGS. 13-17.

In this embodiment, as explained above, by butt-jointing the edges, the sheet P or a strip of uncured rubber is shaped into a cylinder hollow and finally becomes a radial carcass ply in a pneumatic tire for passenger cars. For example, highmodulus polyester fiber cords (1670 dtex/2, Diameter 0.68 mm) are embedded therein at a cord count of 50 ends/5 cm to form a sheet of a thickness 1.10 mm.

Figure 13:
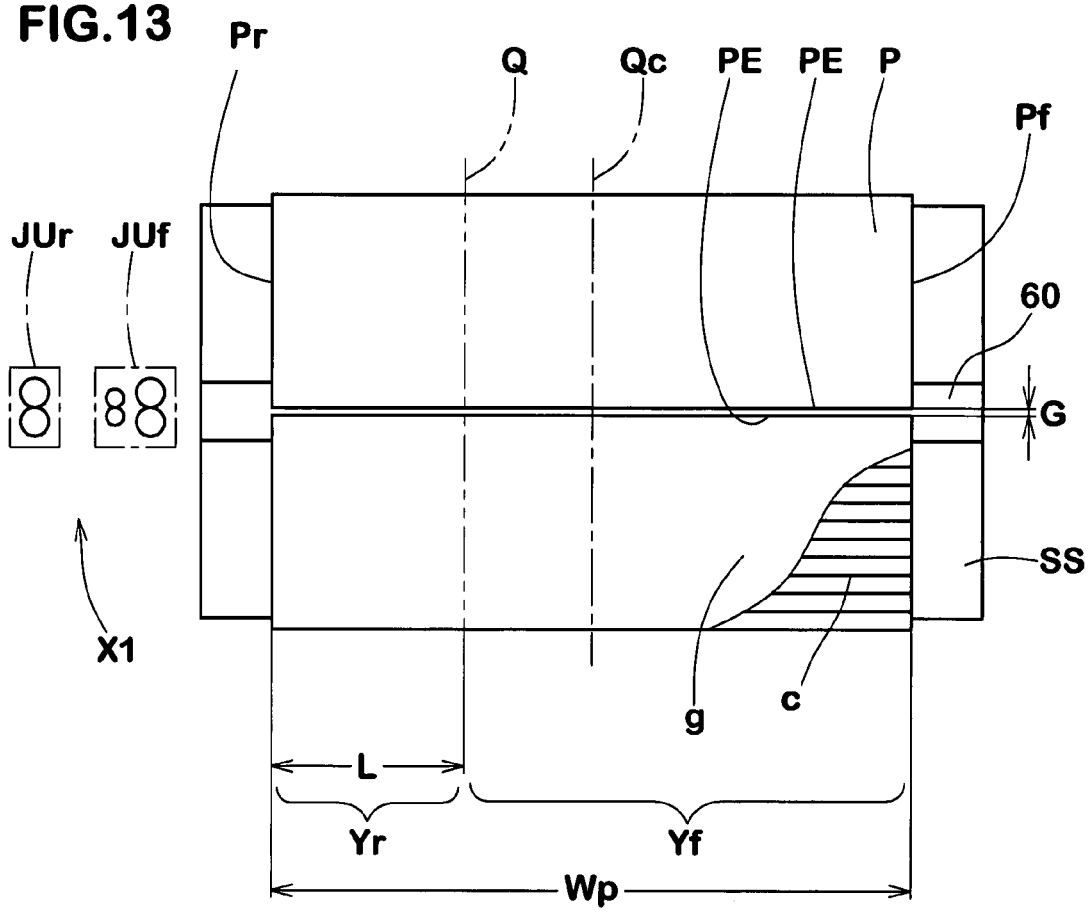
FIGS. 13-17 are schematic plan views for explaining a method for butt-jointing the edges by the use of the apparatus shown in FIG. 1.

As shown in FIG. 13, the rubber sheet P is wound around the drum SS so that the edges PE are positioned at the widthwise center of the groove 60. At that time, the front and rear jointer units JUf and JUr are waiting at a position X1 rearward of the drum SS. In this waiting state at the position X1, by moving the vertically movable frames 17 and 49 of the units JUf and JUr, the sheet supporting faces S of the support plates SPf and SPr are adjusted to the almost same level as the under surface of the rubber sheet P.

Figure 14:
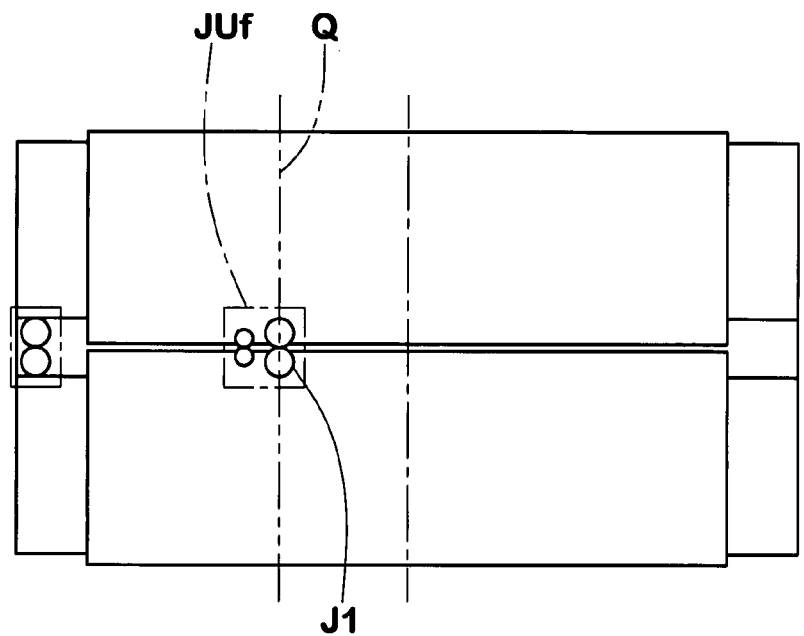

Then, as shown in FIG. 14, the front jointer unit JUf is moved forward so that the upper and lower conical rotators of the primary jointer J1 is positioned at the joint starting position Q. The sheet supporting face S of the support plate SPf is exactly adjusted to the same level as the under surface of the rubber sheet P. By moving the obliquely movable frame 23 and vertically movable frame 38, the upper conical rotators CRuy and CRun are let down to the upper surface of the sheet P so that the edges PE are held between the upper and lower conical rotators.

Figure 15:
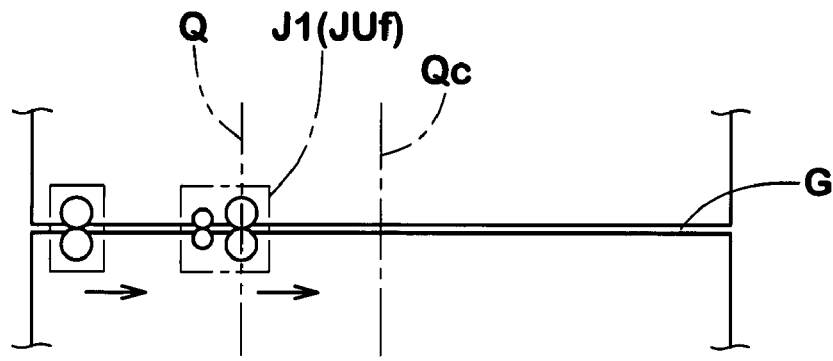
Figure 16:
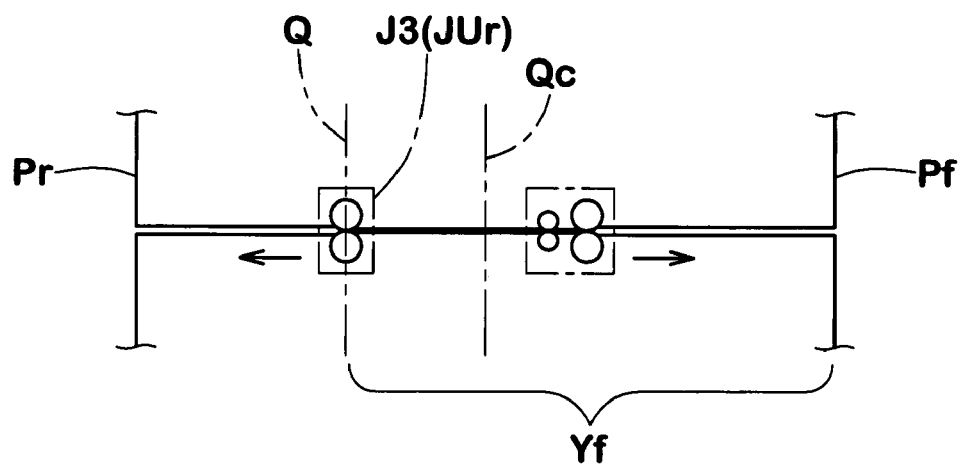
Figure 17:
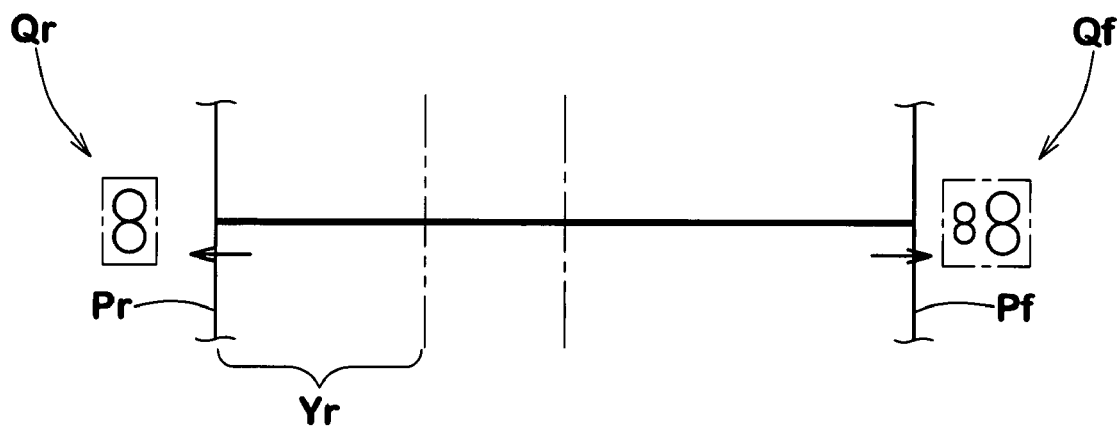

Under such held state, the motors M1 and Mf are actuated to rotate the upper conical rotators CRuy and to move the jointer unit JUf forward from the starting position Q to a stop position Qf beyond the front end Pf as shown in FIGS. 15, 16 and 17. Thus, in a front region Yf between the starting position Q and the front end Pf, the edges PE are drawn toward the center Gc and butt-jointed.

Meanwhile, after the front jointer unit JUf starts from the position Q, the traverser TRr is operated to move the rear jointer unit JUr forward so that the upper and lower rotators of the jointer J3 is positioned at the joint starting position Q. In this position, by moving the vertically movable frame 52, the upper conical rotators CRun are let down to the upper surface of the sheet P, and at the same time, the sheet supporting face S of the support plate SPr is exactly adjusted to the same level as the under surface of the rubber sheet P, whereby the edges PE are held between the upper and lower conical rotators.

When the upper and lower conical rotators of the jointer J1 go beyond the middle position Qc of the edges PE, the rear traverser TRr is operated to move the rear jointer unit JUr rearward (normal traveling direction) from the starting position Q to a stop position Qr beyond the rear end Pr. Thus, in a rear region Yr between the starting position Q and the rear end Pr, the edges PE are drawn toward the center and butt-jointed.

If the distance L between the joint starting position Q and the rear end Pr is less than 50 mm, crinkle and stagger are still liable to occur near the starting position Q. Therefore, the distance L is set in a range of not less than 50 mm, but less than 50% of the total edge length or width Wp of the rubber sheet P.

If the rear traverser TRr is moved early before the jointer J1 goes beyond the middle position Qc, since the length of the butt-jointed edges is not yet so long, there is a possibility that one of the butt-jointed edges is drawn away from the other when the jointer J3 draws the edges unsteadily.

In the rear jointer unit JUr, the distance L0 in the back and forth direction between the conical rotators CRu and CRl and the front edge of the part 45A of the suspending plate 45 is more than the distance L. As a result, a space 58 which accommodates the rear region Yr is formed. However, by constructing the part 45A to penetrate between the unjointed edges PE, L0<L is also possible.

In this example, during jointing the edges PE from the starting position Q to the front end Pf, the rotational speed of the upper conical rotators CRuy of the jointer J1 is gradually decreased.

Figure 18:
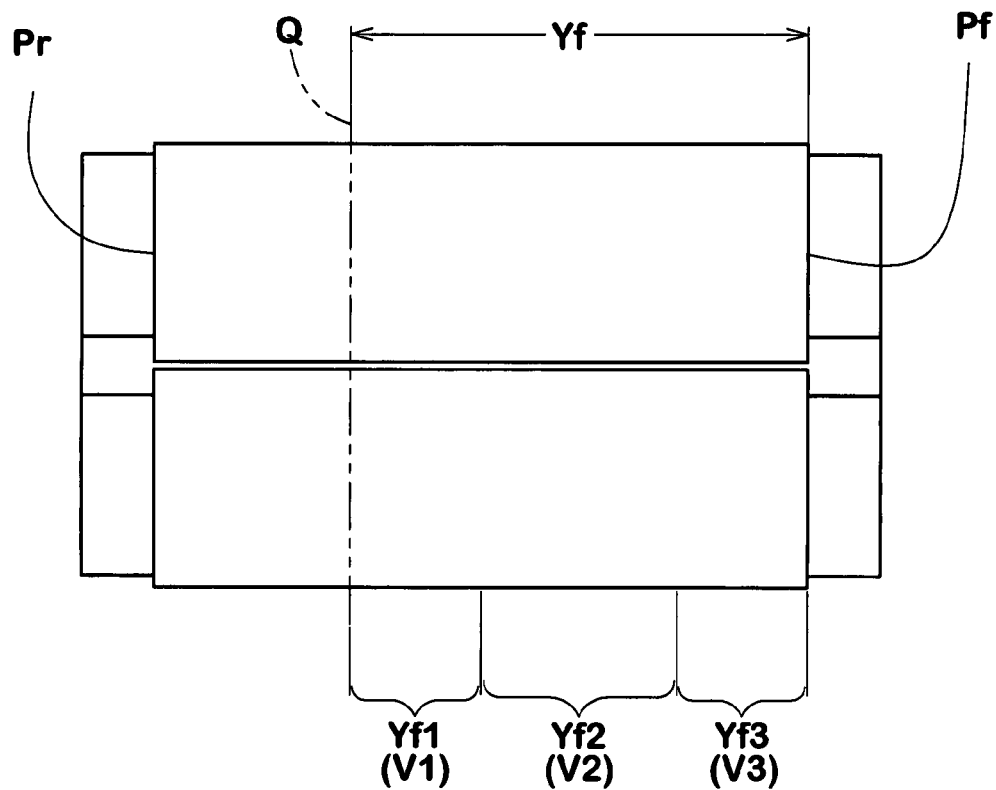
FIG. 18 is a schematic plan view of the sheet supporter drum for explaining the rotational speed of the motor-driven conical rotators of the primary jointer which speed is varied based on the jointing zones.
Figure 19:
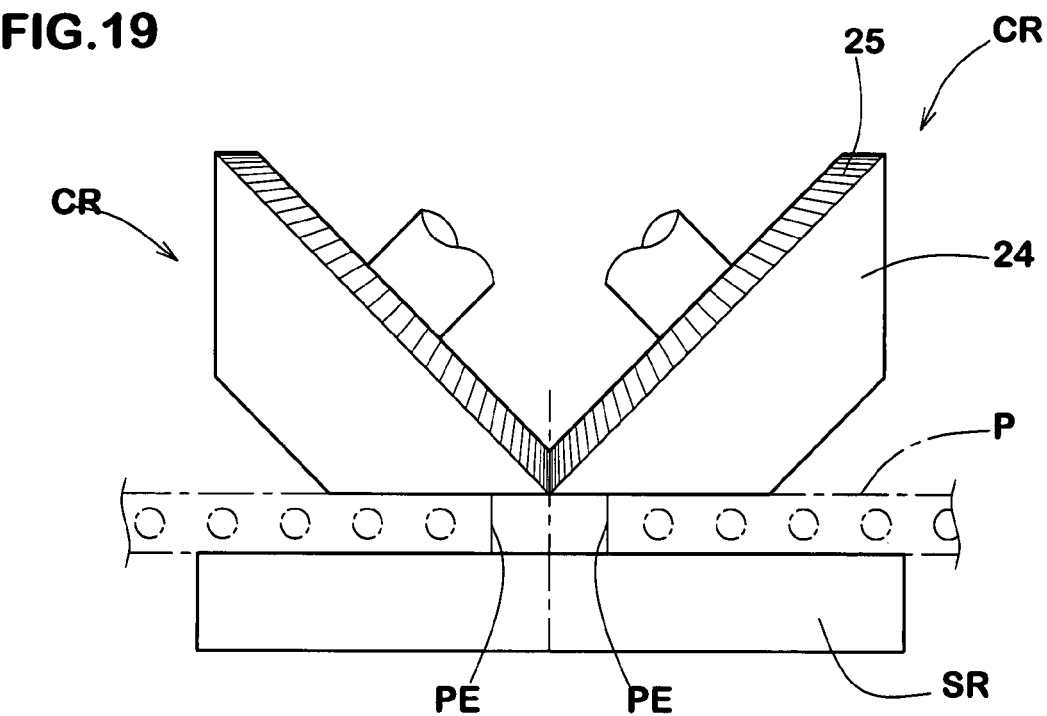
FIG. 19 is a front view showing the prior art jointer.

As shown in FIG. 18, the front region Yf is divided into at least three zones, an initial zone Yf1, a middle zone Yf2 and a final zone Yf3, and the rotational speeds V1, V2 and V3 in the zones Yf1, Yf2 and Yf3, respectively, are controlled as follows:

$V1 > V2 > V3;$ $1.00 < V1/V2 =< 1.10;$ and $0.70 =< V3/V2 =< 0.80.$

Here, the initial zone Yf1 is 2 to 17% of the front region Yf. The final zone Yf3 is 5 to 20% of the front region Yf. The middle zone Yf2 is the rest of the front region Yf.

As to the rotational speed V2 in the middle zone Yf2, it is preferable that the peripheral velocity of the conical outer surface 24S at the large diameter edges E1 of the motordriven conical rotators CRuy is substantially equal to the traveling speed of the front jointer unit JUf, more specifically, in a range of from 95 to 105% of the traveling speed. Therefore, in this embodiment, there is provided with a controller 14 which can control the motor M1 so that the peripheral velocity satisfies the above conditions, based on the position and traveling speed of the front jointer unit JUf which are obtained from sensor devices.

In the final zone Yf3, as the front end Pf is near the motor-driven rotators and the sheet is easy to move, if the rotational speed v3 and traversing speed are high, crinkle or stagger is very liable to occur in this zone Yf3. In the initial zone Yf1, as the front end Pf is very far and thus the sheet is hard to move. Further, as the rear jointer unit JUr starts to move rearward, an appropriate back tension is given to the edges. Therefore, the rotational speed v1 and traversing speed can be maximized to improve the operating efficiency.

The invention claimed is:

1. An apparatus for butt-jointing edges of an elastic material sheet comprising
   a supporter for supporting at least one sheet made from an elastic material such that two edges of said at least one sheet to be butt-jointed are oppositely opposed, the supporter composed of a rotatable drum having a cylindrical outer surface onto which said at least one sheet can be directly or indirectly applied,
   a groove provided in said cylindrical outer surface of the drum to extend from an end of the drum substantially parallel with a rotational axis of the drum, the groove having a groove width such that said two edges of said at least one sheet to be butt-jointed are oppositely opposed within the groove width,
   a jointer comprising
   a pair of upper conical rotators,
   a support plate being able to pass through said groove to support a reverse surface of the applied sheet positioned within the groove width, and
   a pair of lower conical rotators mounted on the support plate so as to position oppositely to the respective upper conical rotators to support said reverse surface together with the support plate,
   a traverser for moving the jointer along the groove between a position at which the jointer is in the groove to allow said support plate and lower conical rotators to support said reverse surface, and a position at which the jointer is out of the groove to allow the drum to rotate,
   the paired upper conical rotators each have having an outer surface which is defined as a conical surface of a truncated right circular cone having a large diameter edge and a small diameter edge, and wherein
   the paired upper conical rotators are arranged such that:
   the rotational axes thereof are placed in a plane and intersect with each other so that the large diameter edges are adjacent to each other at a point;
   the conical surfaces each have a general line to contact with an obverse surface of the applied sheet; and
   the general lines of the two conical surfaces are inclined to the opposite direction to the moving direction of the jointer towards both sides from the center between the two conical surfaces so as to draw the contact surface of the sheet toward the center,
   a small space provided between said adjacent large diameter edges so as to enable the elastic material to be accumulated therein, whereby, when the jointer is moved along the two edges, the paired upper conical rotators draw the two edges towards the center to butt-joint the edges, and the elastic material accumulated in the small space forms a rib-shaped protrusion along the butt-joint after the upper conical rotators pass over, and
   a pressing device provided to press down the rib-shaped protrusion to flatten the surface of the butt-joint.

2. The apparatus according to claim 1, wherein
said jointer is movable from a start position of the entire length of the edges to one end of the edges so as to butt joint a part between the start position and said one end, and
the apparatus further comprises
a second jointer comprising
   a pair of second upper conical rotators,
   a second support plate being able to pass through said groove to support the reverse surface of the applied sheet positioned within the groove width, and
   a pair of second lower conical rotators mounted on the second support plate so as to position oppositely to the respective second upper conical rotators to support said reverse surface together with the second support plate, and
a second traverser for moving the second jointer along the groove between a position at which the second jointer is in the groove to allow said second support plate and second lower conical rotators to support said reverse surface, and a position at which the second jointer is out of the groove,
the second jointer is movable from said start position to the other end of the edges so as to butt-joint a part between the start position and the other end, wherein
the paired second upper conical rotators each have an outer surface which is defined as a conical surface of a truncated right circular cone having a large diameter edge and a small diameter edge, and
the paired second conical rotators are arranged such that:
the rotational axes thereof are placed in a plane and intersect with each other so that the large diameter edges are adjacent to each other at a point;
the conical surfaces each have a general line to contact with the obverse surface of the sheet; and
the general lines of the two conical surfaces are inclined to the opposite direction to the moving direction of the second jointer towards both sides from the center between the conical surfaces so as to draw the contact surface of the sheet toward the center.

3. The apparatus according to claim 2, wherein
the paired upper conical rotators of said first jointer are rotated by a motor controlled such that the rotational speed of the conical rotators gradually decreases from the start position to said one end.

4. The apparatus according to claim 2, wherein
said start position is located at a distance of more than 50 mm from the other end, and between said one end and a halfway point, the halfway point being between said one end and the other end.

5. The apparatus according to claim 1, wherein
the sheet is made from an unvulcanised rubber, and organic fiber cords are embedded therein in parallel with each other.

6. The apparatus according to claim 3, wherein
said start position is located at a distance of more than 50 mm from the other end, and between said one end and a halfway point, the halfway point being between said one end and the other end.

7. The apparatus according to claim 1, wherein the paired lower conical rotators each have an outer surface which is defined as a conical surface of a truncated right circular cone having a large diameter edge and a small diameter edge, and the paired lower conical rotators are arranged such that:

the rotational axes thereof are placed in a plane and intersect with each other so that the large diameter edges are adjacent to each other at a point;

the conical surfaces each have a general line to contact with the reverse surface of the applied sheet; and the general lines of the two conical surfaces are inclined so as to become parallel with the general lines of the upper conical rotators, respectively, or not inclined so as to intersect the general lines of the upper conical rotators, respectively.

8. The apparatus according to claim 2, wherein the paired lower conical rotators of the second jointer each have an outer surface which is defined as a conical surface of a truncated right circular cone having a large diameter edge and a small diameter edge, and the paired lower conical rotators of the second jointer are arranged such that:

the rotational axes thereof are placed in a plane and intersect with each other so that the large diameter edges are adjacent to each other at a point;

the conical surfaces each have a general line to contact with the reverse surface of the applied sheet; and the general lines of the two conical surfaces are inclined so as to become parallel with the general lines of the upper conical rotators of the second jointer, respectively.

* * * * *